United States Patent [19]

Goodwater

[11] Patent Number: 4,604,619

[45] Date of Patent: Aug. 5, 1986

[54] APPARATUS AND METHOD FOR MULTIPLE MODE REMOTE CONTROL SWITCHING

[76] Inventor: Harry C. Goodwater, 450 Ramsell St., San Francisco, Calif. 94132

[21] Appl. No.: 533,097

[22] Filed: Sep. 16, 1983

[51] Int. Cl.[4] .............................................. G05B 23/02
[52] U.S. Cl. ........................... 340/825.18; 340/825.59; 340/543
[58] Field of Search .................. 358/194.1; 178/4.1 R; 307/127, 138, 247 A; 368/69, 70, 184–189, 47; 340/517, 825.59, 543, 825.18

[56] References Cited

U.S. PATENT DOCUMENTS

| | | | |
|---|---|---|---|
| 3,273,039 | 9/1966 | Godshalk et al. | 307/138 X |
| 4,143,368 | 3/1979 | Route et al. | 340/543 |
| 4,386,436 | 5/1983 | Kocher et al. | 358/194.1 X |
| 4,400,658 | 8/1983 | Yates | 307/127 X |

Primary Examiner—Ulysses Weldon
Attorney, Agent, or Firm—Fliesler, Dubb, Meyer & Lovejoy

[57] ABSTRACT

A remote controlled switching apparatus for controlling the operation of a device having a plurality of modes of operation. In the apparatus there is provided a first switch assembly responsive to a positive potential for causing the apparatus to operate in a first mode of operation and a second switch assembly responsive to a negative potential for causing the apparatus to operate in a second mode of operation irrespective of the mode of operation in which the device is then currently operating. Automatic and manually controlled switch assemblies selectively provide the positive and negative potentials. Status indicators provide an indication of the current mode of operation of the device being controlled.

11 Claims, 2 Drawing Figures

APPARATUS AND METHOD FOR MULTIPLE MODE REMOTE CONTROL SWITCHING

The present invention relates to switching apparatus in general, and in particular to multiple mode remote control switching apparatus for use in high rise buildings, office buildings, warehouses and other structures, both large and small, for controlling fans, dampers, life safety and environmental devices and the like during an emergency.

BACKGROUND OF THE INVENTION

In a typical high rise building there frequently is found numerous fans, air conditioning systems, dampers, windows, elevators, water and electrical systems and other electrically controlled or controllable apparatus.

In an emergency, such as a fire, the operation of one or more of such apparatuses must frequently be changed to accommodate the type and location of the emergency. For example, in the event of a fire in one or more areas of a building, the building ventilating system should be capable of automatically changing its operation to prevent the incursion of smoke into the noninvolved areas. This is a very important need, for as is well known, smoke, not flame, is one of the greatest causes of loss of life in a fire. At the same time, whatever automatic control is provided, the controlling system must be capable of being overridden to permit manual control of certain of the apparatus by firemen or other emergency personnel.

In the past, the principle technology used for controlling life safety and environmental control systems in a building during an emergency comprised the use of custom built panels containing heavy duty, "oil tight" switches requiring from seven to nine conductors of large size wire for their operation. More often than not, these controls used high voltages for their operation. The use of high voltages necessitated using separate conduit systems from those provided for the rest of the building's life safety systems. The physical size and high voltage nature of the oil tight switches made them impractical for use in graphic annunciator systems, such as those used by firemen to show the status of a building's ventilation and other systems during a fire.

The prior known systems are not readily adaptable to today's modern technology. For example, they are not easily programmed to control apparatus in different ways to accommodate a fire based on the location of the fire in a building.

SUMMARY OF THE INVENTION

In view of the foregoing, a principle object of the present invention is a remote control switching system for remotely controlling the operation of one or more devices in a building.

Another object of the present invention is a system as described above comprising means for automatically remotely controlling the operation of devices in a building as a function of the nature and location of an emergency in the building.

Another object of the present invention is a system as described above comprising means permitting the manual control of certain ones of such devices without affecting the operation of other ones of such devices which are being controlled automatically.

Still another object of the present invention is a system as described above comprising means for providing a remote read out of the operating status of all controlled devices at all times, as well as, while they are changing from one operational status to another.

In a typical embodiment of the present invention comprising means for automatically controlling the operation of a fan, or other device in an emergency, such as a fire, there is provided an alarm relay circuit, a programmable diode matrix circuit, a switch bank circuit and a fan control relay circuit.

In the alarm circuit, there is provided a relay controlled switch. In an emergency, the switch routes power through the diode matrix to the switchbank circuit and then to the fan control relay circuit to control the operation of the fan.

In the diode matrix circuit, there is provided a diode matrix and a relay controlled switch. The diode matrix receives signals from one or more areas of a building (called "zones") in which a fire may be present. For example, the signals may be generated automatically by smoke detection equipment. Depending on how the diode matrix is programmed, the fan controlled by the matrix may be permitted to remain in it's current operational status or it's operational status may be changed. It may be allowed to run. It may be shut down. Or, its direction may be reversed depending on the location of the fire and which of the several diodes in the diode matrix received a signal.

In the switchbank circuit, there is provided a switch and contact assembly and an number of status lights. The switch and contact assembly is provided for use by a fireman or other person to override the control of the diode matrix and thereby manually control the fan. The status lights provide a visual indication of the operational status of the fan.

In the fan control relay circuit, there is provided a run relay, a stop relay and a plurality of associated switches which are responsive to control signals from the diode matrix or the switch bank, if the latter is being manipulated.

BRIEF DESCRIPTION OF THE DRAWING

The above and other objects, features and advantages of the present invention will become apparent from the following detailed description of the accompanying drawing in which.

DETAILED DESCRIPTION OF THE INVENTION

Figure 1:
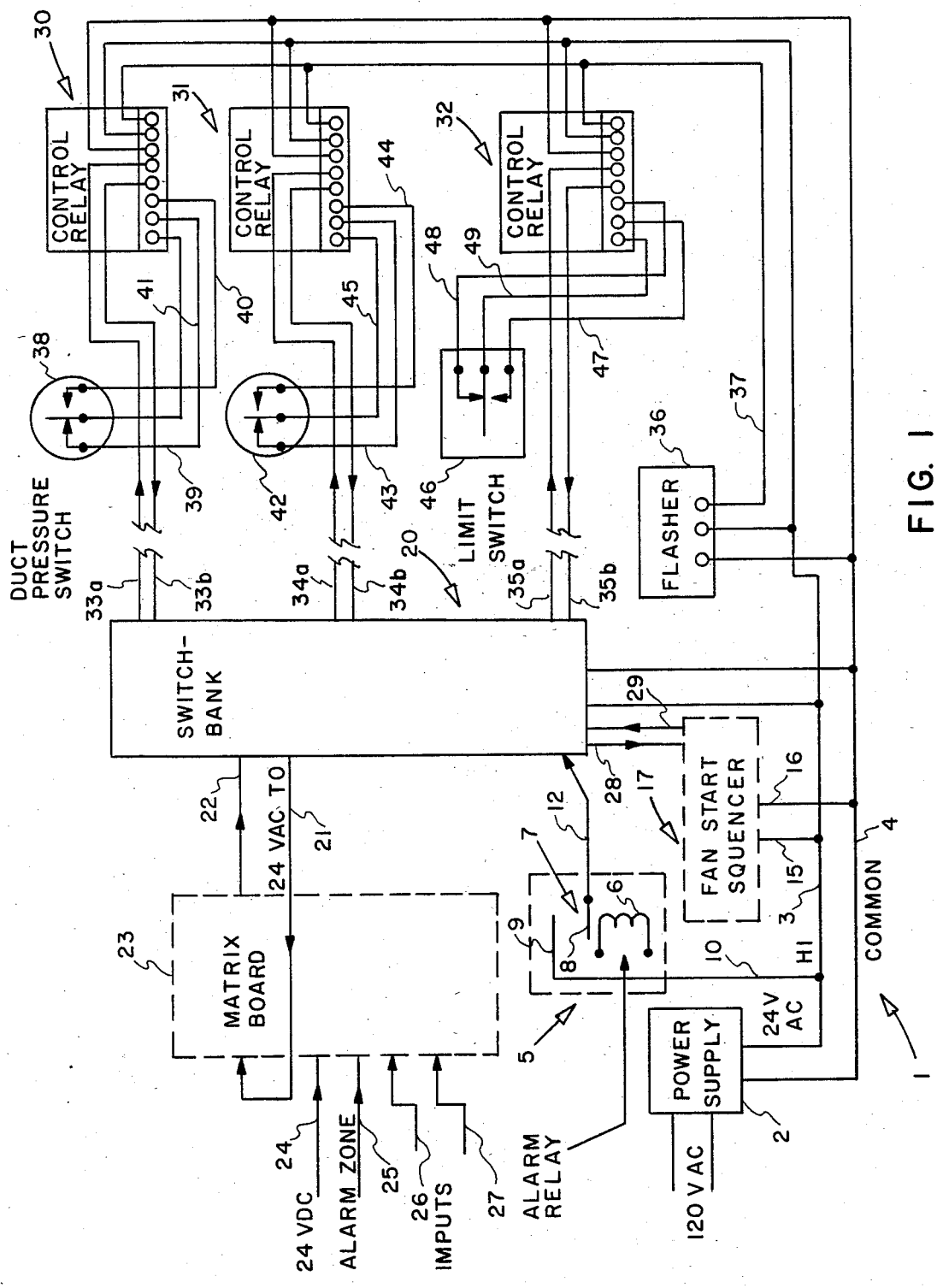
FIG. 1 is a block diagram of an embodiment of the present invention.

Referring to FIG. 1, there is provided in accordance with the present invention a multiple mode remote control switching system designated generally as 1. In system 1, there is provided a power supply 2. Power supply 2 converts 120 VAC to 24 VAC for delivery to the remainder of the system on a pair of lines 3,4 which are also designated HI and Common.

Coupled to line 3, there is provided a fire alarm relay circuit designated generally as 5. Circuit 5 comprises a relay solenoid 6 and a solenoid controlled switch 7 having a wiper 8 and a contact 9. The contract 9 is coupled to the line 3 by means of a line 10.

Coupled to the lines 3 and 4 by means of a pair of lines 15 and 16, there is provided a fan start sequencer designated generally as 17. Sequencer 17 is provided for sequentially starting fans or other large motors and the like in order to avoid loading down the electrical system of the building when all equipment is returned to service after an emergency.

Coupled to lines 3 and 4, there is further provided a switch bank circuit designated generally as 20.

Coupled to switch bank circuit 20 be means of a pair of lines 21 and 22, there is provided a diode matrix circuit designated generally as 23. A 24 VDC supply is coupled to circuit 23 by means of a line 24. A plurality of zone signal lines are coupled to circuit 23 by means of a plurality of lines 25, 26 and 27.

The switch bank circuit 20 is also coupled to the fan start sequencer circuit 17 by means of a pair of lines 28 and 29, to the alarm relay circuit 5 by means of a line 12 and to a plurality of control relay circuits designated generally as 30, 31 and 32 by means of a plurality of line pairs 33a, 33b; 34a, 34b; and 35a, 35b. Each of the circuits 30–32 are also coupled to lines 3 and 4, and to a 24 VAC flasher unit 36 by means of a line 37 and lines 3 and 4.

Coupled to circuit 30, there is provided a duct pressure switch 38. Switch 38 comprises a pair of contacts and a wiper which are coupled to circuit 30 by means of lines 39, 40 and 41, respectively. Circuit 31 is coupled to a duct pressure switch 42. Switch 42 is provided with a pair of contacts and a wiper which are coupled to circuit 31 by means of lines 43, 44 and 45, respectively. Circuit 32 is coupled to a limit switch 46. Switch 46 comprises a pair of contacts and a wiper which are coupled to circuit 32 by means of lines 47, 48 and 49.

Figure 2:
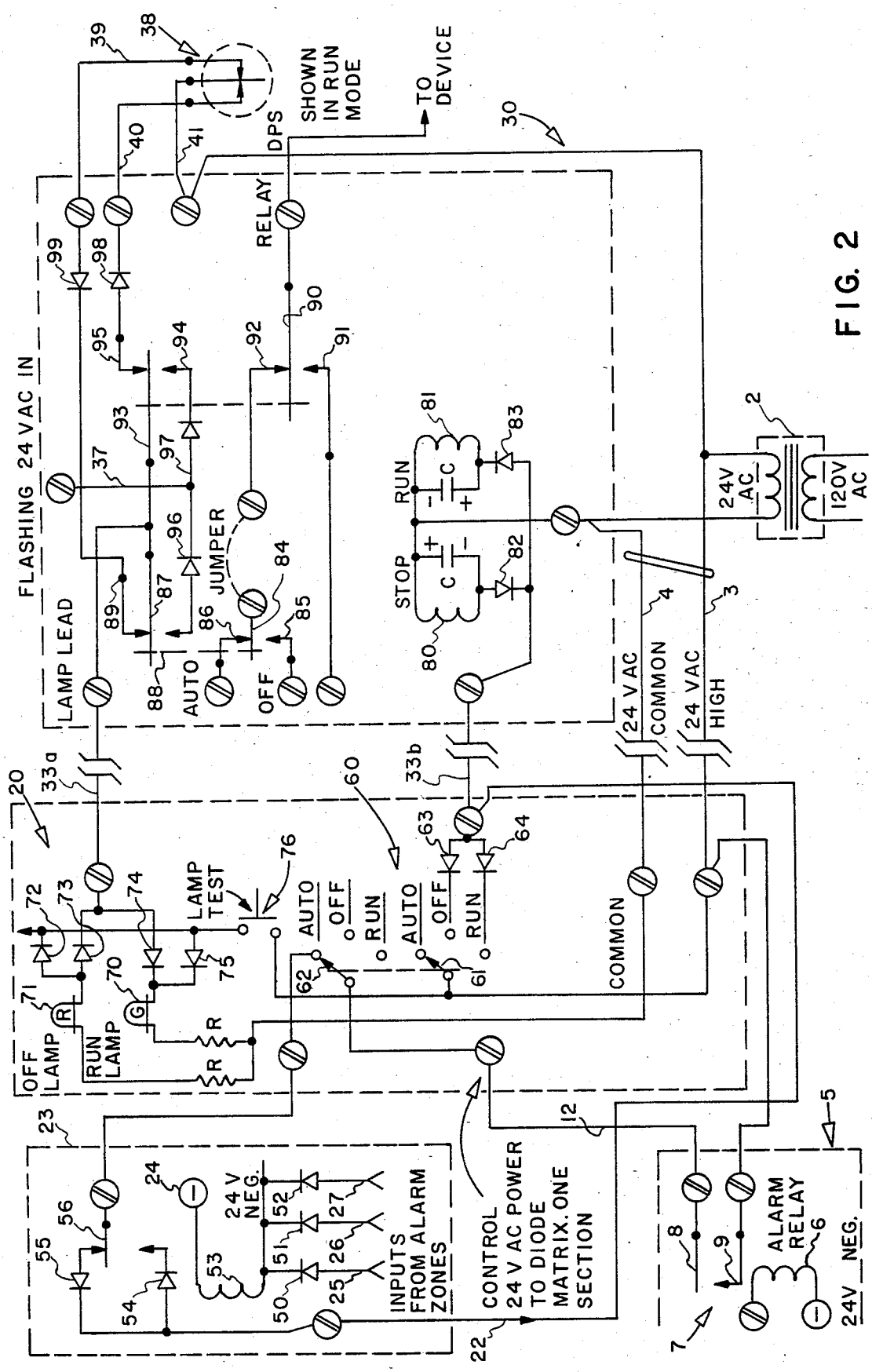
FIG. 2 is a partial schematic diagram of the embodiment of FIG. 1.

Referring to FIG. 2 there is provided in the diode matrix circuit 23, a plurality of diodes 50, 51 and 52 having cathodes coupled in common to a solenoid 53. The opposite end of the solenoid 53 is coupled to the line 24. Above the solenoid 53, there is provided a pair of diodes 54 and 55 coupled to the line 22. The opposite end of the diodes 54 and 55 are coupled to contacts for making contact with a wiper 56. The wiper 56 is coupled to the line 21.

Referring to the switch bank circuit 20, there is provided a double pole switch 60. Switch 60 has one wiper 61 coupled to line 3 and a second wiper 62 coupled to line 12. Wiper 61 and 62 are provided to make contact in unison with three contacts designated AUTO, OFF AND RUN. Wiper 61 is provided to make contact with a pair of diodes 63 and 64. The AUTO contact is coupled to line 21. The anode of diode 63 and the cathode of diode 64 are coupled in common to line 22 and to line 33b.

Located at the upper end of switch bank 20, as shown in FIG. 2, there is provided a GREEN lamp 70 and a RED lamp 71. Lamp 70 is called the RUN lamp and lamp 71 is called the OFF lamp. Coupled to each of the lamps 70 and 71 is a current limiting resistor R. Coupled to the opposite sides of the lamps 70 and 71, there is provided a pair of diodes 72 and 73 and 74 and 75, respectively, coupled to the line 33a.

Below the lamps 70 and 71, there is provided a test lamp switch 76 which is coupled to the diodes 72 and 75.

Referring to the fan control relay circuit 30, and in particular, to the line 33b, there is provided coupled to the line 33b a pair of solenoids 80 and 81 coupled in parallel with a capacitor C through a pair of diodes 82 and 83, respectively. The solenoid 80 controls a switch comprising a wiper 84 and an pair of contacts 85 and 86 and a switch comprising a wiper 87 and a pair of contacts 88 and 89. The solenoid 81 controls a switch comprising a wiper 90 and a pair of contacts 91 and 92 and a switch comprising a wiper 93 and a pair of contacts 94 and 95. Coupled to the contacts 88 and 94, there is provided a pair of diodes 96 and 97.

Coupled between the diodes 96 and 97, there is connected the flasher unit 36 by means of the line 37. Coupled to the contact 95, there is provided a diode 98. Coupled to the contact 89, there is provided a diode 99. The diodes 98 and 99 are coupled to lines 40 and 39, respectively of the duct pressure switch 38. The wiper and line 41 of switch 38 is coupled to the 24 VAC supply by means of line 3.

Coupled to the contact 86, there is provided a screw terminal designated AUTO. Coupled to the contact 85, there is provided a screw terminal designated OFF. Coupled to the contact 91, there is provided a screw terminal designated RUN. In practice, the AUTO terminal is connected to a thermostat or similar type of control device for placing on contact 86 a potential sufficient to operate the device, such as a fan, connected thereto by means of the jumper connecting wiper 84 and contract 92. Similarly, the RUN terminal connected to contact 91 is connected to a potential of the same magnitude.

In operation, in the absence of an alarm condition, a device, such as a fan connected to wiper 90, will be operating in a normal mode. That is, it will either be running or it will be shut down. Assuming that the fan is running and an alarm condition arises such that the alarm relay 5 energizes, the alarm relay 5 will move wiper 8 to contact 9 and cause 24 VAC to be routed through switch 60 to the diode matrix 23. From matrix 23, the 24 VAC will be routed on line 22 through diode 83. The reason for this is that diode 55 rectified the 24 VAC such that only the positive portion of the 24 VAC will pass through the diode 83, energize the solenoid 81 and cause wiper 90 to contact the RUN contact 91. Since, as assumed, the fan was already running, the fan will continue to run. If, however, a signal is received from one of the zones in the building through one of the diodes 25–27 in the diode matrix 23, the wiper 56 would be coupled to diode 54 and only the negative portion of the 24 VAC would pass through the diode matrix 23. If that should occur, then only the negative portion of the 24 VAC would be on line 22 and the relay 80 in the fan control circuit 30 would be energized. If this were to occur, it can be seen that the fan would be shut down because the wiper 84 has been move from the AUTO contact 86 to the OFF contact 85 and in this embodiment, no power is applied to the contact 85.

Referring to the upper part of the circuit 30, it can be seen that if solenoid 80 is energized, the wiper 87 is moved from contact 89 to contact 88. When that happens, the negative portion of the flashing 24 VAC passes through diode 96 and onto line 33a, through diode 73 and lamp 71. Lamp 71 will thus be caused to flash. However, the flashing will only be momentary. As soon as the duct pressure switch 38 senses that the pressure in the duct has decreased to a predetermined level, the wiper connected to line 41 will move to the contact connected to line 40. When this occurs, the negative portion of the 24 VAC on line 41 will be fed through diode 98, contact 95, wiper 93 to line 33a and then through diode 73 to lamp 71. Since the 60 cycle 24 VAC is so much faster than the flashing 24 VAC, the lamp 71 will burn continuously. This will clearly indicated to the operator that, in deed, the fan has been turned off. Conversely, if the fan had initially been turned off, an energizing of the solenoid 81 would move wiper 93 into contact with contact 94 allowing the positive portion of the 24 VAC to pass through diodes 97 and 74 to flash lamp 70. When the duct pressure becomes sufficient, wiper 41 of switch 38 would apply 60 cycle 24 VAC to line 33a and cause lamp 70 to burn continuously.

In addition to the automatic response of the system to an alarm condition, it is also possible for an operator to move the switch in the switch bank 60 from AUTO to OFF or RUN. In either case, the system will no longer respond to the diode matrix 23, but, will be controlled entirely by the switch bank control circuit 60. For example, with switch 60 in its OFF position, 24 VAC on the line 3 is applied to the cathode of diode 63 and rectified such that only the negative portion of the 24 VAC is passed by the diode 63 and applied to the diodes 82 and 83 of the control circuit 30. With only the negative portion of the 24 VAC applied to the diode 82 and 83, only the diode 82 will conduct, energizing the STOP solenoid 80, moving the wiper 84 to the contact 85 and removing power from the device. With the switch 60 in its ON position, the 24 VAC on the line 3 is applied to the anode of the diode 64 and rectified such that only the positive portion of the 24 VAC is passed by the diode 64 and applied to the diodes 82 and 83 of the control circuit 30. With only the positive portion of the 24 VAC applied to the diodes 82 and 83, only the diode 83 will conduct energizing the RUN solenoid 81, moving the wiper 90 to the contact 91 and applying power to the device connected to the wiper 90. The status lamps 70 and 71 will, of course, function as described above.

While a preferred embodiment of the invention has been described, it is contemplated that those skilled in the art can readily make changes to the embodiment described without departing from the spirit and scope of the present invention. For example, while only a single device is described as being controlled by the apparatus of the present invention with respect to FIG. 2, it is understood that a plurality of devices can be so controlled and that the types of devices which can be so controlled are for most purposes unlimited with respect to their nature and purpose. Accordingly, it is intended that the scope of the invention not be limited to the embodiments described, but rather, be determined by reference to the claims hereinafter provided.

What is claimed is:

1. A remote controlled switching apparatus for controlling the operation of a device having a plurality of modes of operation comprising:
   a first switch means having a wiper which is movable between a first and a second position, a first contact adapted to be contacted by said wiper of said first switch means when said wiper of said first switch means is moved from its first to its second position and means for moving said wiper of said first switch means;
   a second switch means having a wiper which is movable between a first and a second position, a first contact adapted to be contacted by said wiper of said second switch means when said wiper of said second switch means is in its first position, a second contact adapted to be contacted by said wiper of said second switch means when said wiper of said second switch means is in its second position, a first diode having an anode coupled to said first contact of said second switch means, a second diode having a cathode coupled to said second contact, and means for moving said wiper of said second switch means between said first and said second positions;
   a third switch means having a first and a second wiper which are ganged together and movable between a first, a second and a third position, a first contact adapted to be contacted by said first wiper when said first and second wipers are in their first position, a second contact adapted to be contacted by said second wiper when said first and second wipers are in their second position, a third contact adapted to be contacted by said second wiper when said first and second wipers are in their third position, a first diode having a cathode coupled to said second contact, a second diode having an anode coupled to said third contact, and a means for moving said first and second wipers in unison;
   a fourth switch means having a wiper which is movable between a first and a second position, a first contact adapted to be contacted by said wiper of said fourth switch means when said wiper of said fourth switch means is in its first position and a second contact adapted to be contacted by said wiper of said fourth switch means when said wiper of said fourth switch means is in its second position, means for coupling said wiper of said fourth switch means to said device, means for coupling said second contact to a source of power, and means, including a diode having a cathode coupled to a relay, for moving said wiper of said fourth switch means;
   a fifth switch means having a wiper which is movable between a first and a second position, a first contact adapted to be contacted by said wiper of said fifth switch means when said wiper of said fifth switch means is in its first position and a second contact adapted to be contacted by said wiper of said fifth switch means when said wiper of said fifth switch means is in its second position, means for coupling said first contact to a source of power, means for coupling said wiper of said fifth switch means to said first contact of said fourth switch means, and means, including a diode having an anode coupled to a relay, for moving said wiper of said fifth switch means;
   means for coupling said wiper of said first switch means and said first wiper of said third switch means;
   means for coupling said first contact of said first switch means to a source of AC power;
   means for coupling said first and said second diodes of said second switch means to said diodes in said means for moving said wipers of said fourth and said fifth switch means;
   means for coupling said second wiper of said third switch means to said source of AC power; and
   means for coupling said first and said second diodes of said third switch means to said diodes in said means for moving said wipers in said fourth and said fifth switch means, such that when a positive potential from said diodes in said second or said third switch means is applied to said diodes in said fourth and said fifth switch means, said wiper in said fourth switch means is moved from its first position to its second position and, when a negative potential from said diodes in said second or said third switch means is applied to said diodes in said fourth and said fifth switch means, said wiper in said fourth switch means is moved from its first position to its second position.

2. An apparatus according to claim 1 comprising means coupled to said device and responsive to a signal from said device for indicating the current mode of operation of said device.

3. An apparatus according to claim 2 wherein said indicating means comprises means coupled to said device for indicating when said device is changing from one mode of operation to another.

4. An apparatus according to claim 2 wherein said indicating means comprises lamp means and means coupled to said device for flashing said lamp means when said device is changing from one mode of operation to another.

5. An apparatus according to claim 4 wherein said lamp means comprises a first lamp means for indicating when said device is in its first mode of operation and a second lamp means for indicating when said device is in its second mode of operation and wherein said flashing means comprises means for flashing said second lamp means when said device is changing from its first to its second mode of operation and means for flashing said first lamp means when said device is changing from its second to its first mode of operation.

6. A remote controlled switching apparatus for controlling the operation of a device having a plurality of modes of operation comprising:
   first switch means responsive to a first control signal for causing said device to operate in a first mode of operation irrespective of the mode of operation in which said device is then currently operating;
   second switch means which is responsive to a second control signal for causing said device to change from said first mode of operation to a second mode of operation; and
   third switch means coupled to said first and said second switch means for selectively causing said device to operate in one of its modes of operation irrespective of the existence or nonexistence of said first and said second control signals;
   means for coupling said apparatus to a source of AC power;
   a fourth switch means coupled between said first, said second and said third switch means and said device which is responsive to a positive potential from said first, said second and said third switch means for causing said device to operate in said first mode of operation; and
   a fifth switch means coupled between said first, said second and said third switch means and said device which is responsive to a negative potential from said first, said second and said third switch means for causing said device to operate in said second mode of operation; and
   wherein said second and said third switch means each comprise rectifying means which is responsive to said AC power for selectively providing said positive and said negative potentials to said fourth and said fifth switch means.

7. An apparatus according to claim 6 comprising means for indicating the current mode of operation of said device.

8. An apparatus according to claim 7 wherein said indicating means comprises means coupled to said device for indicating when said device is changing from one mode of operation to another.

9. An apparatus according to claim 7 wherein said indicating means comprises lamp means and means for flashing said lamp means when said device is changing from one mode of operation to another.

10. An apparatus according to claim 9 wherein said lamp means comprises a first lamp means for indicating when said device is in its first mode of operation and a second lamp means for indicating when said device is in its second mode of operation and wherein said flashing means comprises means for flashing said second lamp means when said device is changing from its first to its second mode of operation and means for flashing said first lamp means when said device is changing from its second to its first mode of operation.

11. A method of controlling the operation of a device having a plurality of modes of operation comprising the steps of:
   providing a first switch means responsive to a first control signal for causing said device to operate in a first mode of operation irrespective of the mode of operation in which said device is then currently operating;
   providing a second switch means which is responsive to a second control signal for causing said device to change from said first mode of operation to a second mode of operation;
   providing a third switch means coupled to said first and said second switch means for selectively causing said device to operate in one of its modes of operation irrespective of the existence or nonexistence of said first and said second control signals;
   providing a means for coupling said first means to a source of AC power;
   providing a fourth switch means coupled to said first, said second and said third switch means which is responsive to a positive potential for causing said device to operate in said first mode of operation;
   providing a fifth switch means coupled to said first, said second and said third switch means which is responsive to a negative potential for causing said device to operate in said second mode of operation; and
   wherein said steps of providing said second and said third switch means comprise the step of providing in each of said second and said third switch means a rectifying means which is responsive to said AC power for selectively providing said positive and said negative potentials to said fourth and said fifth switch means.

* * * * *

UNITED STATES PATENT AND TRADEMARK OFFICE
CERTIFICATE OF CORRECTION

PATENT NO. : 4,604,619

DATED : August 5, 1986

INVENTOR(S) : Harry C. Goodwater

It is certified that error appears in the above-identified patent and that said Letters Patent is hereby corrected as shown below:

The title page should be deleted to appear as per attached title page.

Figure 2 of the drawings should be deleted to be replaced with figure 2 as shown on the attached sheet.

United States Patent [19]

Goodwater

[11] Patent Number: 4,604,619

[45] Date of Patent: Aug. 5, 1986

[54] APPARATUS AND METHOD FOR MULTIPLE MODE REMOTE CONTROL SWITCHING

[76] Inventor: Harry C. Goodwater, 450 Ramsell St., San Francisco, Calif. 94132

[21] Appl. No.: 533,097

[22] Filed: Sep. 16, 1983

[51] Int. Cl.³ .................................. G05B 23/02
[52] U.S. Cl. ...................... 340/825.18; 340/825.59; 340/543
[58] Field of Search .................. 358/194.1; 178/4.1 R; 307/127, 138, 247 A; 368/69, 70, 184–189, 47; 340/517, 825.59, 543, 825.18

[56] References Cited

U.S. PATENT DOCUMENTS

| | | | |
|---|---|---|---|
| 3,273,039 | 9/1966 | Godshalk et al. | 307/138 X |
| 4,143,368 | 3/1979 | Route et al. | 340/543 |
| 4,386,436 | 5/1983 | Kocher et al. | 358/194.1 X |
| 4,400,658 | 8/1983 | Yates | 307/127 X |

Primary Examiner—Ulysses Weldon
Attorney, Agent, or Firm—Fliesler, Dubb, Meyer & Lovejoy

[57] ABSTRACT

A remote controlled switching apparatus for controlling the operation of a device having a plurality of modes of operation. In the apparatus there is provided a first switch assembly responsive to a positive potential for causing the apparatus to operate in a first mode of operation and a second switch assembly responsive to a negative potential for causing the apparatus to operate in a second mode of operation irrespective of the mode of operation in which the device is then currently operating. Automatic and manually controlled switch assemblies selectively provide the positive and negative potentials. Status indicators provide an indication of the current mode of operation of the device being controlled.

11 Claims, 2 Drawing Figures

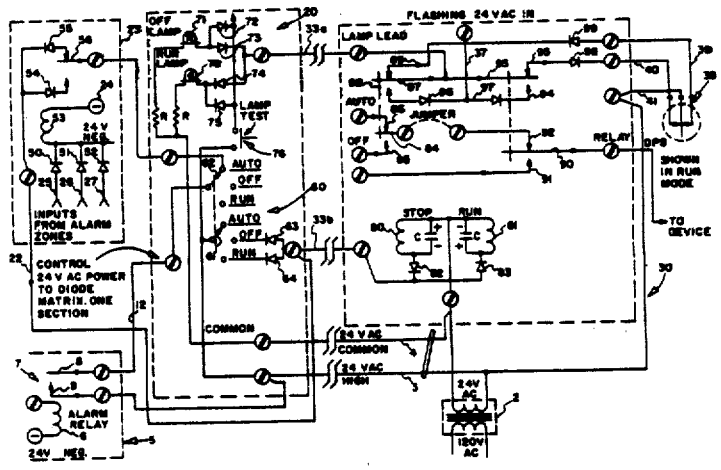

UNITED STATES PATENT AND TRADEMARK OFFICE
CERTIFICATE OF CORRECTION

PATENT NO. : 4,604,619

DATED : August 5, 1986

INVENTOR(S) : HARRY C. GOODWATER

Page 3 of 3

It is certified that error appears in the above-identified patent and that said Letters Patent is hereby corrected as shown below:

In the drawing, the polarity of diode 64 should be reversed as shown below.

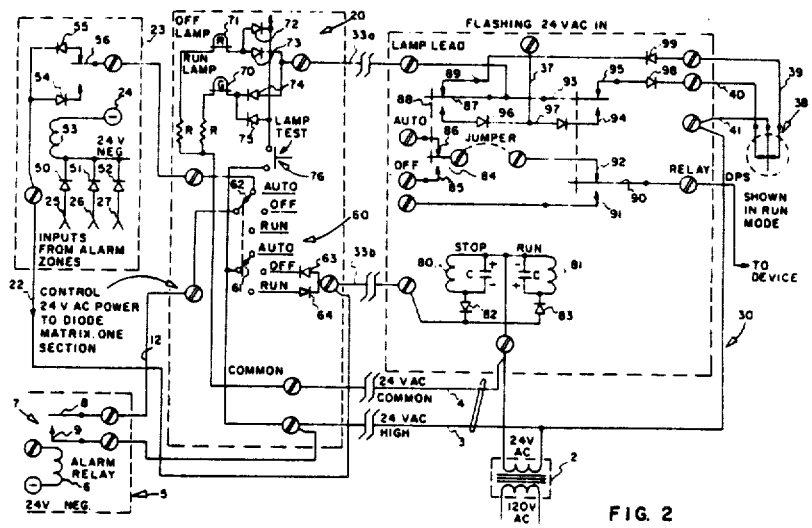

FIG. 2

Signed and Sealed this

Twenty-ninth Day of September, 1987

Attest:

DONALD J. QUIGG

Attesting Officer

Commissioner of Patents and Trademarks